United States Patent [19]

Veermeer

[11] Patent Number: 5,726,384
[45] Date of Patent: Mar. 10, 1998

[54] ELECTRICAL FITTING SUPPORT DEVICE

[76] Inventor: Christian Julian Veermeer, 18 Theresa Avenue, Camps Bay 8001, South Africa

[21] Appl. No.: 609,462

[22] Filed: Mar. 1, 1996

[51] Int. Cl.[6] .................................................. H02G 3/22
[52] U.S. Cl. ........................... 174/48; 174/49; 174/50; 174/54; 174/61; 174/64; 52/220.1; 220/3.7; 248/906
[58] Field of Search ........................... 174/48, 49, 50, 174/53, 54, 58, 59, 60, 61, 62, 63, 64, 135; 52/220.1; 220/3.7; 248/906

[56] References Cited

U.S. PATENT DOCUMENTS

| | | | |
|---|---|---|---|
| 881,897 | 3/1908 | Burke | 52/220.1 |
| 5,289,934 | 3/1994 | Smith et al. | 220/3.7 |
| 5,448,012 | 9/1995 | Jacob | 174/48 |

Primary Examiner—Leo P. Picard
Assistant Examiner—David Foster
Attorney, Agent, or Firm—Jones & Askew

[57] ABSTRACT

An electrical fitting support device includes a housing having a cylindrical tubular wall with a first open end and a base end opposite to the first end. A base is provided at the base end of the housing, and is constituted by two base walls extending at right angles to each other from a central longitudinal plane of the housing and being adapted to fit over a protruding corner edge of two adjoining building walls. An inlet formation is joined to the base and includes a hole for receiving an electrical conductor. A number of protrusions extend from the housing at its first end and have threaded holes for receiving screws for fitting a lid over the open end. At least two spaced apart lugs are provided extending outwardly from the housing and each of the lugs has an aperture for receiving a fastening element for attachment of the housing to a protruding corner edge of two adjoining building walls.

7 Claims, 6 Drawing Sheets

ELECTRICAL FITTING SUPPORT DEVICE

An electrical fitting support device includes a housing having a cylindrical tubular wall with a first open end and a base end opposite to the first end. A base is provided at the base end of the housing, and is constituted by two base walls extending at right angles to each other from a central longitudinal plane of the housing and being adapted to fit over a protruding corner edge of two adjoining building walls. An inlet formation is joined to the base and includes a hole for receiving an electrical conductor. A number of protrusions extend from the housing at its first end and have threaded holes for receiving screws for fitting a lid over the open end. At least two spaced apart lugs are provided extending outwardly from the housing and each of the lugs has an aperture for receiving a fastening element for attachment of the housing to a protruding corner edge of two adjoining building walls.

FIELD OF INVENTION

The present invention relates to an electrical fitting support device for fitting against a protruding corner edge of two adjoining building walls.

BACKGROUND TO INVENTION

A lightable corner fitting in the form of a guard is described in U.S. Pat. No. 5,297,011 issued Mar. 22, 1994. This guard is attachable to the protruding corner edge of two adjoining walls. It utilizes a flexible cover to protect occupants and objects that impact the corner edge. While the lightable corner fitting is capable of illuminating areas adjacent a building and also includes a number of favourable additional characteristics, such as being responsive to a smoke alarm, it does not provide a fitting by means of which electrical components, such as lights, movement detectors, etc. can be fitted easily and rapidly.

With the foregoing in mind it is an object of the present invention to provide an electrical fitting support device for fitting against a protruding corner edge of two adjoining walls of a building which offers the facility of easily fitting other electrical or electronic components.

SUMMARY OF INVENTION

According to the invention, an electrical fitting support device for fitting against a protruding corner edge of two adjoining building walls is provided, which device includes
(a) a housing having a round cylindrical tubular wall with a first open end and a base end opposite to the first end;
(b) a base at the base end of the housing, the base being constituted by two base walls extending at right angles to each other from a central longitudinal plane of the housing and being adapted to fit over a protruding corner edge of two adjoining building walls;
(c) an internally threaded inlet formation joined to the base and including a channel for receiving an electrical conductor;
(d) A lid removably attached to the housing for closing off the first open end;
(e) a number of protrusions inwardly extending from the tubular wall of the housing at the first open end and having threaded holes for receiving screws for removably fitting the lid over the first open end; and
(f) at least two spaced apart lugs extending outwardly from the housing and each of the lugs having an aperture for receiving a fastening element for attachment of the housing to a protruding corner edge of two adjoining building walls.

The inlet formation may be located substantially centrally on the base, or may be located off-centre on the base.

The electrical fitting support device may include a hollow cylindrical formation extending from one base wall and having a hole leading into the inlet formation for receiving an electrical conductor.

The electrical fitting support device may include a platform extending across the housing's inside along the central longitudinal plane of the housing.

The electrical fitting support device may be injection moulded of plastics material or may be cast of metal.

BRIEF DESCRIPTION OF DRAWINGS

The invention will now be described by way of example with reference to the accompanying schematic drawings.

In the drawings there is shown in.

DETAILED DESCRIPTION OF PREFERRED EMBODIMENTS

Figure 1:
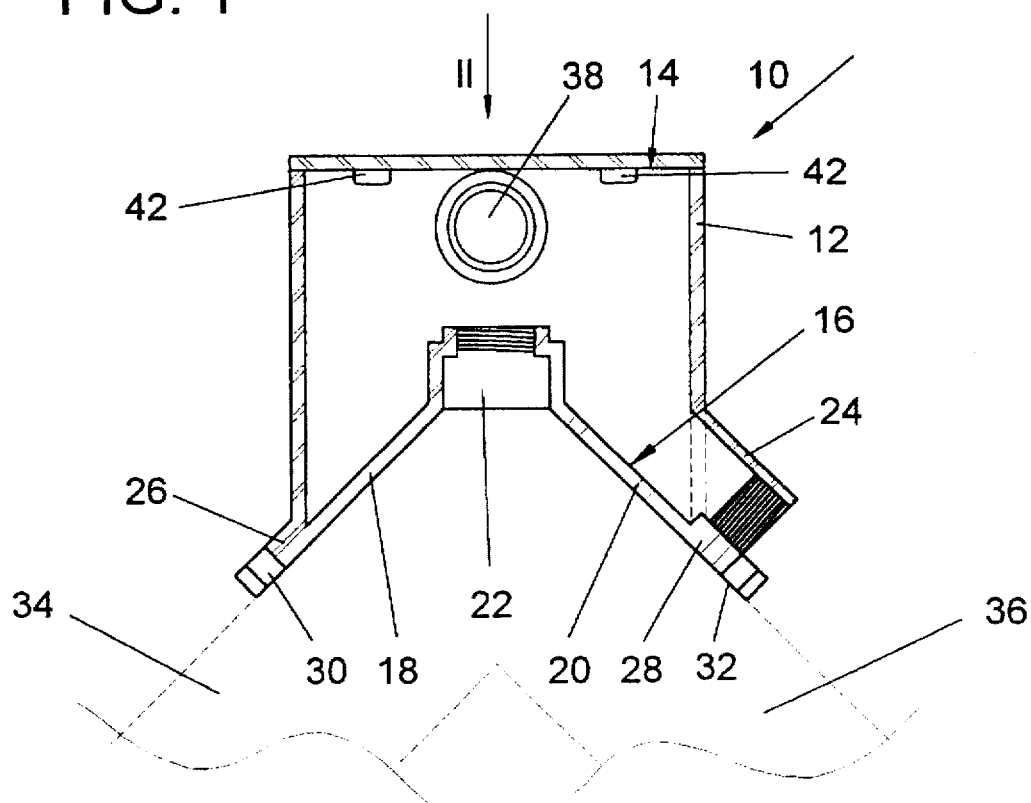
FIG. 1 a sectional side view of a first embodiment of an electrical fitting support device in accordance with the invention.
Figure 2:
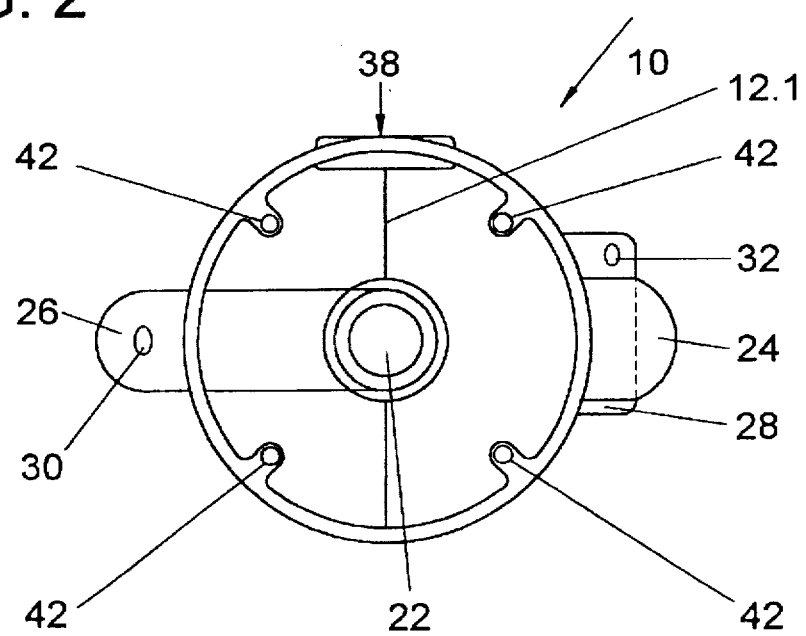
FIG. 2 a view seen along arrow II in FIG. 1 but with the cover plate of the fitting support device removed.

Referring to FIGS. 1 and 2, the electrical fitting support device, generally indicated by reference numeral 10, includes a housing 12 formed by a cylindrical tubular wall and having an open end 14 and a base 16.

A central plane would pass through the position indicated by reference numeral 12.1 in FIG. 2, this also being the meeting position of two abutment plates 18, 20 constituting the base 16 shown in FIG. 1.

Centrally, at the meeting position 12.1 of the two plates 18, 20 a threaded tube 22 with an internal channel is provided.

A second threaded tube 24 is provided on a side of the housing 12 against the plate 20.

The device 10 has outwardly projecting lugs 26, 28 with holes 30, 32 for attaching the fitting support device to the walls 34, 36 at a corner of a building.

The device 10 further has at least one opening 38 in the housing 12.

In use the device 10 is fitted against a protruding corner edge of two adjoining building walls so that the building walls 34, 36 abut against the plates 18, 20. Electrical conductors are led through the tube 22 from the building into the housing 12. If required further electrical conductors may be fitted, such electrical conductors passing through the hole 38 or the tube 24 to inside the housing 12 or to the outside thereof.

The tubes 22, 24 are threaded internally for receiving an externally threaded plug (with a hole) for closing off the respective tube 22, 24.

A cover plate 40 may be attached removably to the open end 14 of the housing 12 by screwing it to lugs 42 provided on the inside of the housing 12 and having threaded holes.

Figure 3:
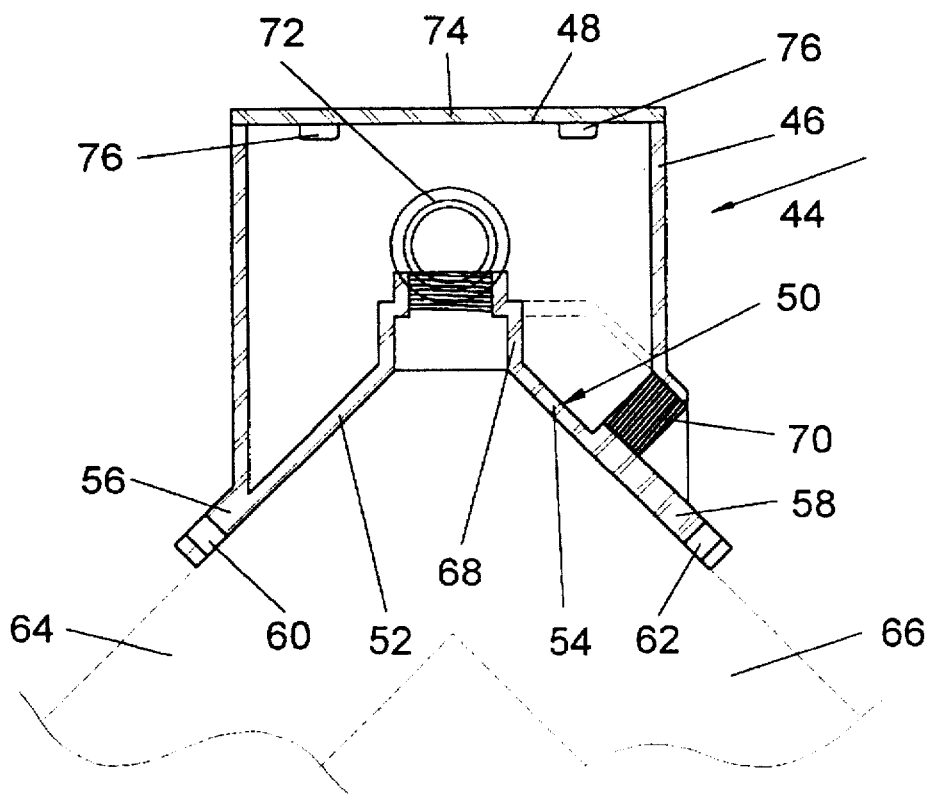
FIG. 3 a sectional side view of a second embodiment of an electrical fitting support device in accordance with the invention.
Figure 4:
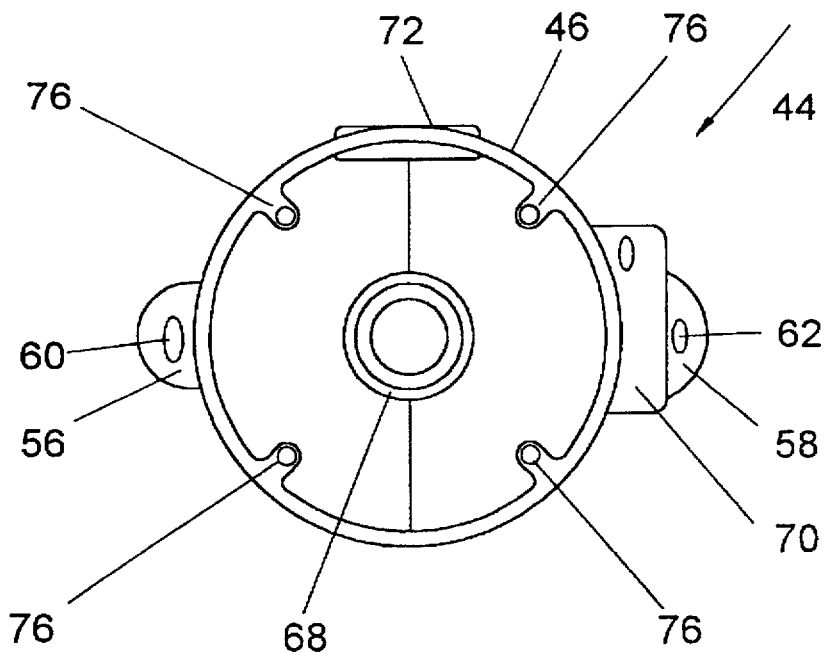
FIG. 4 a top view of the electrical fitting support device shown in FIG. 3 but with the cover plate of the fitting support device removed.
Figure 5:
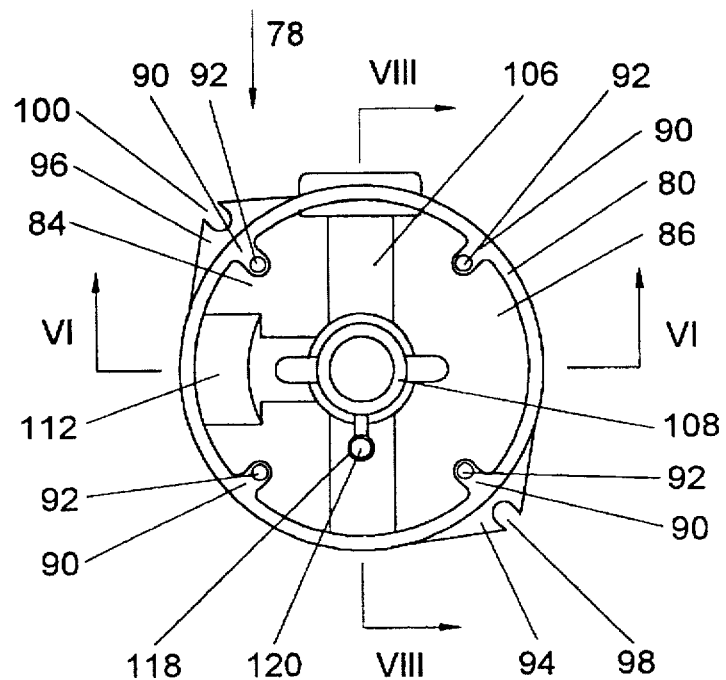
FIG. 5 an end view of a third embodiment of an electrical fitting support device in accordance with the invention but with its cover plate removed.
Figure 6:
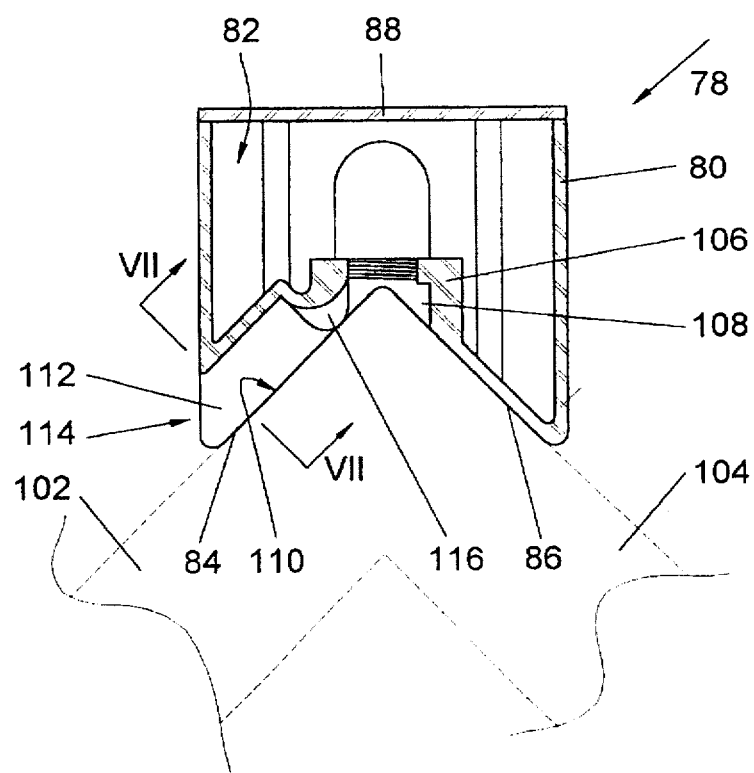
FIG. 6 a sectional view seen along arrows VI—VI in FIG. 5.
Figure 7:
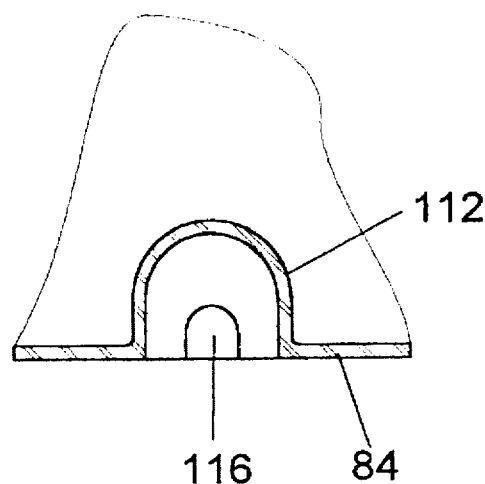
FIG. 7 a sectional view seen along arrows VII—VII in FIG. 6.
Figure 8:
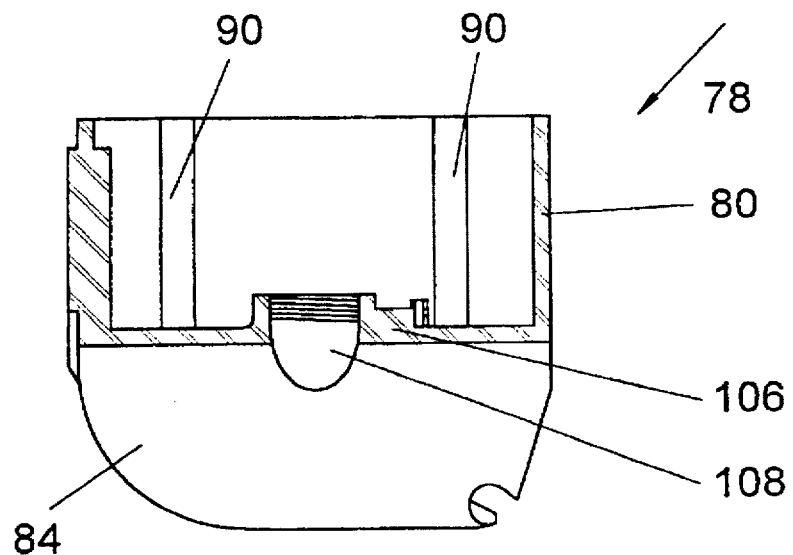
FIG. 8 a sectional view seen along arrows VIII—VIII in FIG. 5.
Figure 9:
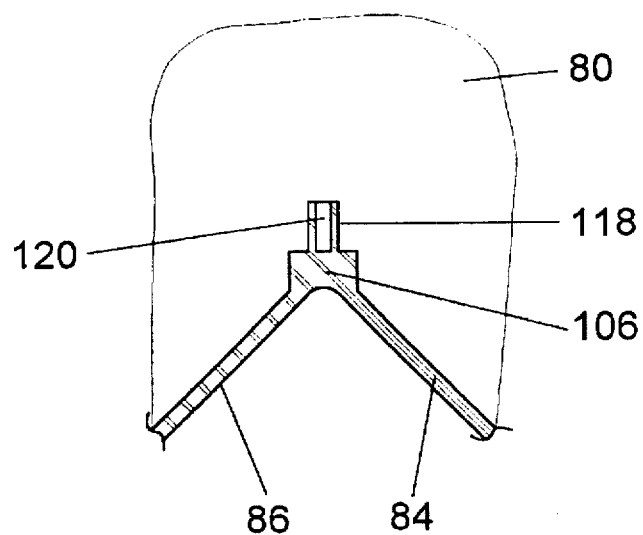
FIG. 9 a sectional view seen along arrows IX—IX in FIG. 5.

Referring now to FIGS. 3 and 4 the second embodiment of an electrical fitting support device, generally indicated by reference numeral 44, includes a housing 46 having a cylindrical tubular wall with an open end 48 and a base 50 formed by two abutment plates 52, 54. The device 44 further has lugs 56, 58 with holes 60, 62 for fitting it to a protruding corner edge of two adjoining walls 64, 66 of a building.

A threaded tube 68 leads into the housing 46 and a further threaded tube 70 is provided on the side of the housing 46 against the plate 54.

At least one hole 72 is provided in the housing 46 for leading into the housing. The open end 48 is closable by means of a cover plate 74 which can be screwed to lugs 76 having threaded holes.

The device 44 is used similarly to the fitting 10 illustrated in FIGS. 1 and 2.

In FIGS. 5 to 9 a third embodiment of an electrical fitting support device is illustrated. This device, generally indicated by reference numeral 78, includes a housing 80 constituted by a cylindrical tubular wall having, at one end, an open end 82 and being closed at its opposite and by means of two abutment plates 84, 86 arranged at 90° to each other.

The open end 82 may be closed off by means of a cover plate 88 removably attachable by way of screws to elongated cylindrical posts 90 provided inside the housing 80 and having screw-threaded holes 92.

The housing 80 has external lugs 94, 96 with apertures 98, 100 for receiving screws for attachment of the device 78 to a protruding corner edge of two adjoining building walls 102, 104.

On its inside, the housing 80 is provided with a transverse platform 106 along the meeting edges of the plates 84, 86, which platform 106 centrally supports a threaded tube 108.

The plate 84 has an aperture 110 about which a cylindrical body 112 is formed and which is open at its end 114 and has a hole 116 at its opposite end.

The platform 106 further supports a rounded pillar 118 which has a threaded hole 120 for receiving a screw for connecting an earth wire thereto.

In use an electrical cable or conductor is passed along or inside a wall at a corner of a building and is led through the tube 108 into the housing 80. The individual wires are then fitted to an electrical component, which is, for instance, mounted on the plate 88. If required a further cable or wires are passed through the cylinder 112 and through the hole 116 to be suitably fitted to an electrical component.

Figure 10:
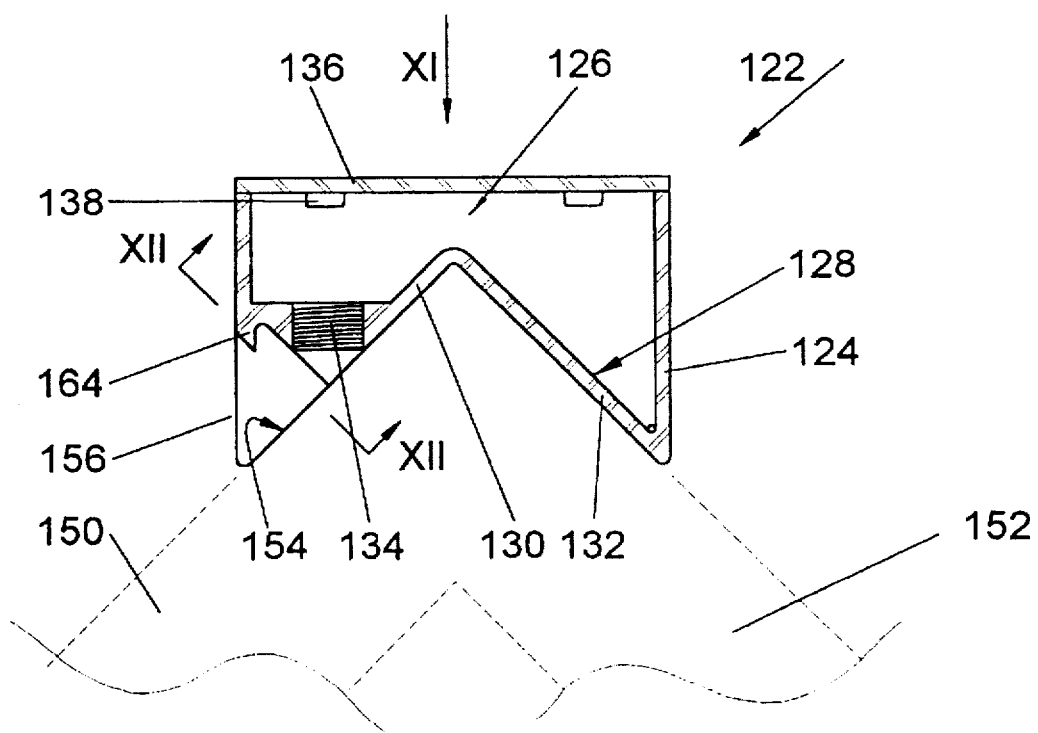
FIG. 10 a sectional side view of a fourth embodiment of an electrical fitting support device in accordance with the invention and as seen along arrows X—X in FIG. 11.
Figure 11:
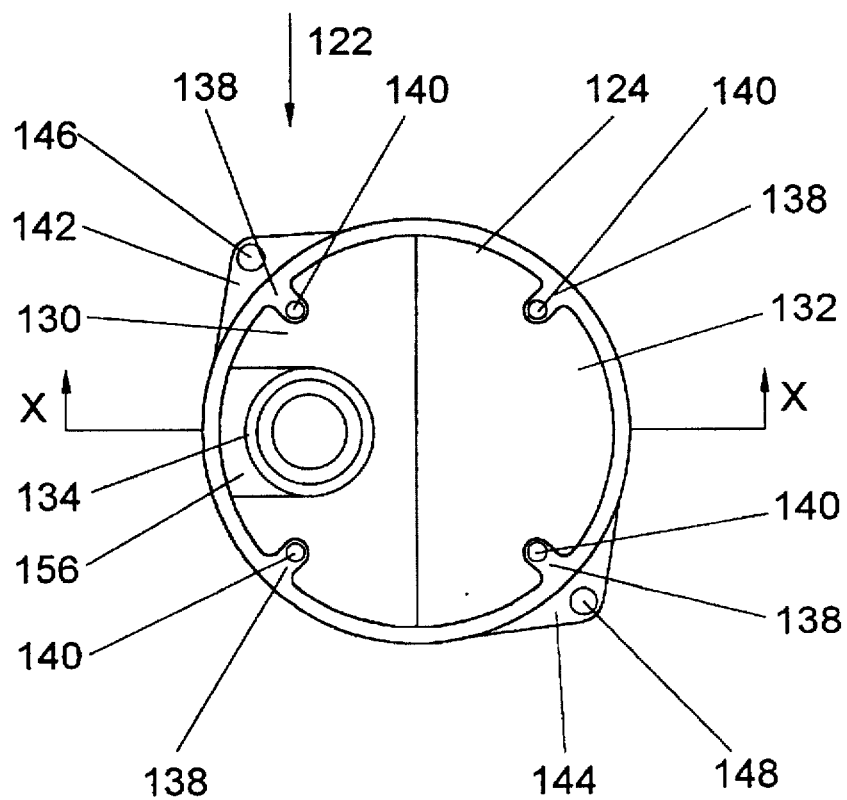
FIG. 11 a view seen along arrow XI in FIG. 10 but with the cover plate of the fitting support device removed.

Referring to FIGS. 10 and 11 the electrical fitting support device, generally indicated by reference numeral 122, includes a housing 124 formed by a cylindrical tubular wall and having an open end 126 and a base 128.

The base 128 is constituted by two abutment plates 130, 132 which are at substantially right angles to each other.

A threaded tube 134 is provided at the plate 130, off-centre from the centre of the housing 124 as shown.

The open end 126 may be closed off by means of a cover plate 136 removably attachable by means of screws to lugs 138 having threaded holes 140 and being provided on the inside of the housing 124.

The housing 124 has external lugs 142, 144 with holes 146, 148 for receiving screws for attachment of the device 122 to building walls 150, 152 at the protruding corner edge of such building walls.

The wall 124 has an aperture 154 about which a cylindrical body 156 is formed and which is open at its end 158 and has a hole 160 at its opposite end wall 162. At the open end 158 a pointed knob or formation 164 is provided.

In use an electrical cable, conduit or conductor is passed along or inside a wall at a corner of a building and is led through the open end 156 and through the hole 158 into the threaded tube 134 into the housing 124. On the inside of the housing 124 a water tight gland is fitted to the threaded tube. The pointed knob or formation 164 serves to locate the cable, conduit or conductor and to prevent it from slipping out.

As in the case of the other devices described with reference to the previous drawings the individual wires of such a cable or conductor are then connected to an electrical component (e.g. a light socket), which is, for instance, mounted on the plate 136.

Figure 12:
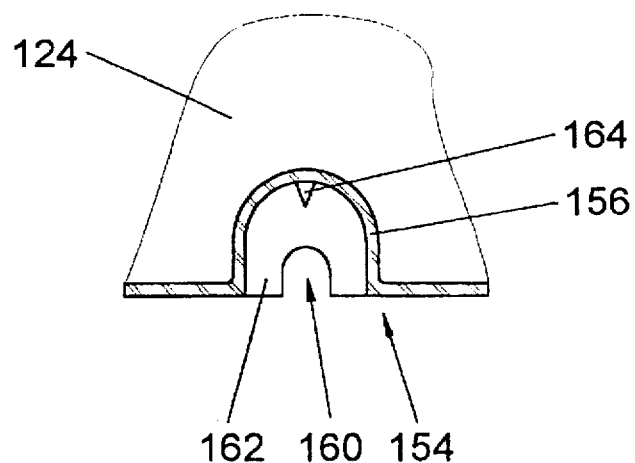
FIG. 12 a partial sectional view seen along arrows XII—XII in FIG. 10.

A particular advantage of the device 122 of FIGS. 10, 11 and 12 in comparison to the devices 10, 44, 78 illustrated in the other drawings, is that it is shorter and therefore requires less material for its manufacture. Furthermore, it is less voluminous and this results in less storage space or space required for transportation.

The devices 10, 44, 78 and 122 of the drawings preferably are formed integrally, e.g. by injection moulding of suitable plastics material, or by metal casting.

I claim:

1. An electrical support device for fitting against a protruding corner edge of two adjoining building walls, which device includes:

(a) a housing having a round cylindrical tubular wall with a first open end and a base end opposite to the first end;

(b) a base at the base end of the housing, the base being constituted by two base walls extending at right angles to each other from a central longitudinal plane of the housing and being adapted to fit over a protruding corner edge of two adjoining building walls;

(c) an internally threaded inlet formation joined to the base and including a channel for receiving an electrical conductor;

(d) a lid removably attached to the housing for closing off the first open end;

(e) a number of protusions inwardly extending from the tubular wall of the housing at the first open end and having threaded holes for receiving screws for removably fitting the lid over the first open end; and (f) at least two spaced apart lugs extending outwardly from the tubular wall of the housing and each of the lugs having an aperture for receiving a fastening element for attachment of housing to a protruding corner edge of two adjoining building walls.

2. An electrical fitting support device as claimed in claim 1, in which the inlet formation is located substantially centrally on the base.

3. An electrical fitting support device as claimed in claim 1, in which the inlet formation is located off-centre on the base.

4. An electrical fitting support device as claimed in claim 1, which includes a hollow cylindrical formation extending from one base wall and having a hole leading into the inlet formation for receiving an electrical conductor.

5. An electrical fitting support device as claimed in claim 1, which includes a platform extending across the housing's inside along the central longitudinal plane of the housing.

6. An electrical fitting support device as claimed in claim 1, which is injection moulded of plastics material.

7. An electrical fitting support device as claimed in claim 1, which is cast of metal.

* * * * *